(Model.)

D. B. KENDALL.
Hose Coupling.

No. 238,294.                    Patented March 1, 1881.

Witnesses:
Charles Sanborn
Joseph Henry Thorp

Inventor:
David Blagden Kendall

UNITED STATES PATENT OFFICE.

DAVID B. KENDALL, OF HOWLAND FLAT, TABLE ROCK P. O., CALIFORNIA.

HOSE-COUPLING.

SPECIFICATION forming part of Letters Patent No. 238,294, dated March 1, 1881.

Application filed June 7, 1880. (Model.)

*To all whom it may concern:*

Be it known that I, DAVID B. KENDALL, of Howland Flat, county of Sierra, State of California, have invented an Improved Hose-Coupling; and I hereby declare the following to be a full, clear, and exact description thereof.

My invention relates to a new and useful hose-coupling; and it consists in the employment of a metallic fastener formed by attaching strips of metal to a ring, so that the whole will form a series of elastic tapering clamps, surrounding the hose at its joint, said fastener being capable of compression by a circular band, which slips over it.

It consists, further, in supporting the inside of the hose, at its joint, by a short piece of pipe, the pieces of hose fitting over it, the said interior pipe being combined with a certain construction of exterior compressing devices, all of which will hereinafter more fully appear.

Figure 1:
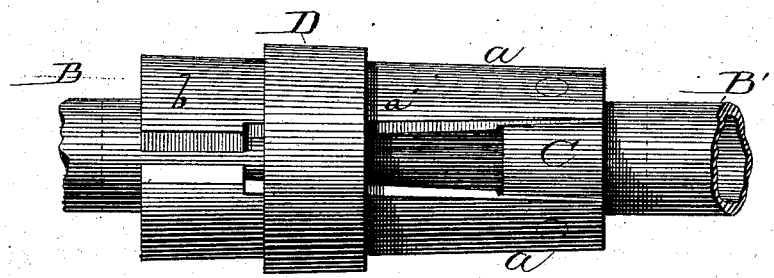
Figure 2:
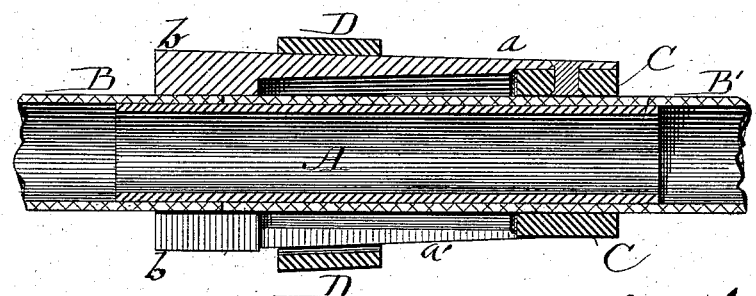

Referring to the accompanying drawings, Figure 1 is a side elevation of my device. Fig. 2 is a longitudinal vertical section.

Let B represent one piece of hose, and B' another. An end of each fits over the pipe A.

The outside fastener is formed by the ring C, to which are riveted strips of metal a' a', having a shank, a, and a wide head or holder, b, curved as shown, to fit the circumference of the hose, the joint of which is made to come about the middle of the heads. The inner surfaces of the heads b are grooved, so as to form slight ridges or corrugations or teeth, for the purpose of securing a firmer gripe upon the hose. The heads b of the strips a' are not wide enough to have their edges meet. They thus form an incomplete cylinder.

The device is slipped over the hose so that the heads b shall cover the joint therein, and, on account of the heads being thicker than the shanks which connect them with the ring, the whole device is tapering, being larger at the head than at the ring.

The strips a' act as springs, which allow the segmental heads to be compressed when the ring or band D is slipped upon it. I have shown three strips a'; but I could have more, keeping their heads small enough to form a broken circumference, so that they could be compressed.

The band D is a transverse section of a cone, in order to fit the shape of the fastening device and act as a holder, which, when pushed up toward the heads b, compresses them, so that their grooved inner surfaces are pressed against the hose. The inner pipe, A, resists the compression, and thus the ends of the hose are held firmly between them.

Having thus described my invention, what I claim as new, and desire to secure by Letters Patent, is—

1. A hose-coupler consisting of the inner pipe, A, and the outer fastening device formed of the ring C, strips a', riveted thereto, with their curved heads b, grooved on their under surfaces, and the band D, for slipping over the fastening device, whereby its heads b are made to take firm hold upon the hose and secure the joint over which they fit, substantially as and for the purpose herein described.

2. A hose-coupling device consisting of the elastic strips or arms a', secured to the ring C, and having the segmental heads b, and adapted to clasp the meeting ends of two sections of hose and compress them upon an inner pipe, A, by means of the exterior compressing-ring, D, substantially as herein described.

In witness whereof I have hereunto set my hand.

DAVID BLAGDEN KENDALL.

Witnesses:
 CHARLES SANBORN,
 T. A. MCFARLAND.